United States Patent [19]

Burt

[11] 4,252,497
[45] Feb. 24, 1981

[54] ARTICLE HANDLING SYSTEM

[75] Inventor: Harold S. Burt, Mendota, Ill.

[73] Assignee: Heico Inc., Mendota, Ill.

[21] Appl. No.: 826,772

[22] Filed: Aug. 22, 1977

Related U.S. Application Data

[63] Continuation-in-part of Ser. No. 723,027, Sep. 13, 1976, Pat. No. 4,114,939.

[51] Int. Cl.$^3$ ............................................. B65G 47/91
[52] U.S. Cl. ..................................... 414/627; 414/72;
414/121; 414/274; 414/752; 414/619
[58] Field of Search ............... 214/1 BS, 1 BT, 1 BV,
214/1 BH, 8.5 D; 414/121, 72, 225, 280, 752,
274, 744, 75, 737; 294/64 R, 65 R, 64 A, 64 B;
269/21; 251/325; 340/166 R; 235/452, 478, 201 RS

[56] References Cited

U.S. PATENT DOCUMENTS

| | | | |
|---|---|---|---|
| 2,783,018 | 2/1957 | Lytle | 294/64 R X |
| 3,351,219 | 11/1967 | Ruderfer | 414/274 |
| 3,716,147 | 2/1973 | Pipes | 214/1 BT |
| 3,850,313 | 11/1974 | Rackman et al. | 214/1 BB |

Primary Examiner—Frank E. Werner
Attorney, Agent, or Firm—Wegner, Stellman, McCord, Wiles & Wood

[57] ABSTRACT

An article handling system and, more particularly, a box or container picker system having miniaturized components for detecting the presence as well as the orientation of various sizes of boxes and containers in a pallet layer of product including suction cups and associated pneumatically-operated sensing structure arranged in arrays for detecting the presence or absence of a box or container therebeneath during a cycle and controls for determining the coordinates at which box presence is detected and also for activating those suction heads which are to function to pick a box from a layer of product. The vacuum pickup head including the suction cup has a casing with an interior vacuum chamber controlled by a motor-operated valve member which, in one position, connects an operating negative pressure to a suction cup and, in another position, closes off the negative pressure and connects the suction cup to atmosphere. As part of the miniaturization, a plurality of suction cups are associated with a single valve member whereby the position of a single valve member controls the condition of a plurality of suction cups.

11 Claims, 10 Drawing Figures

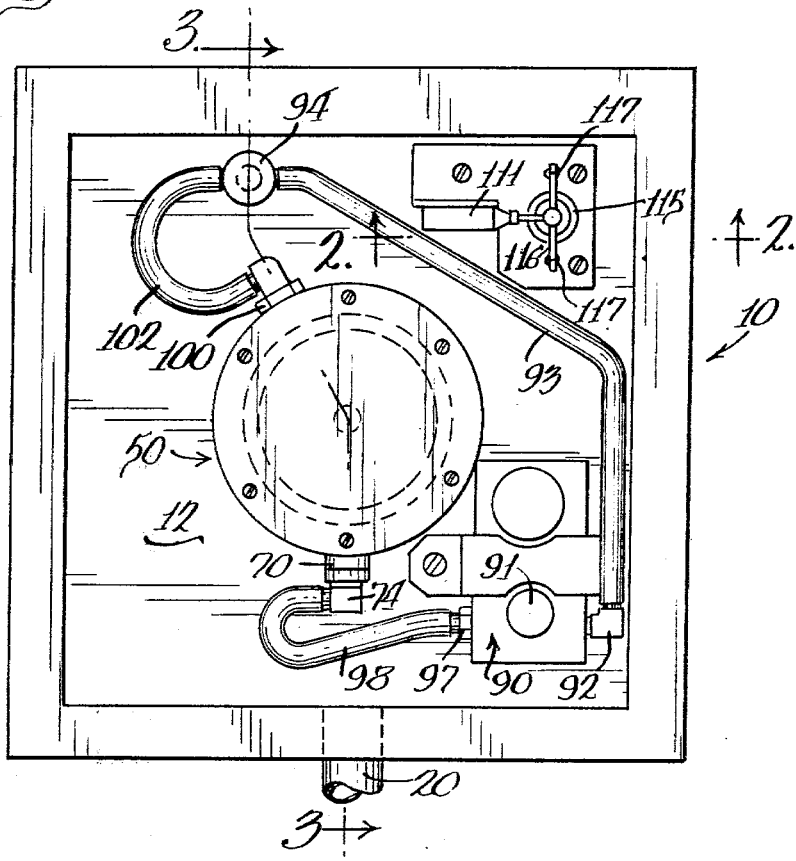
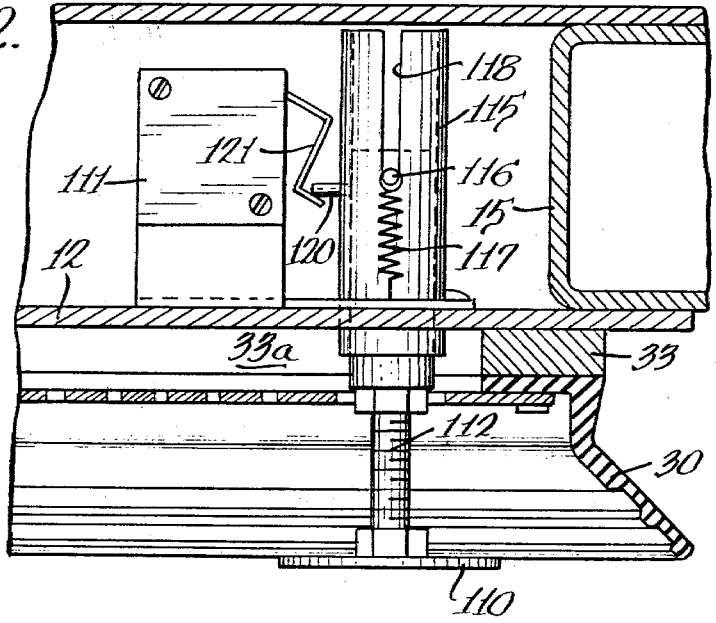

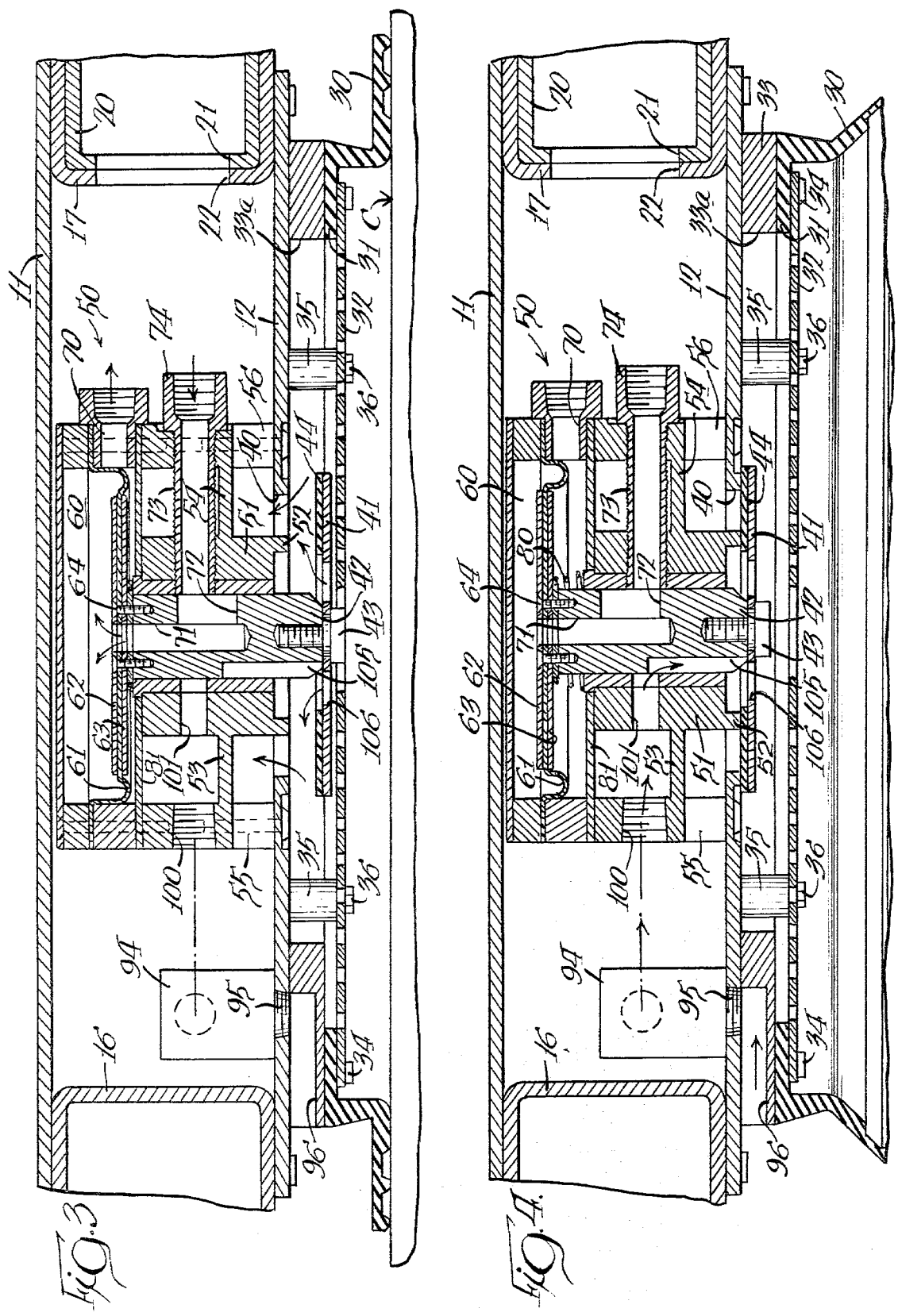

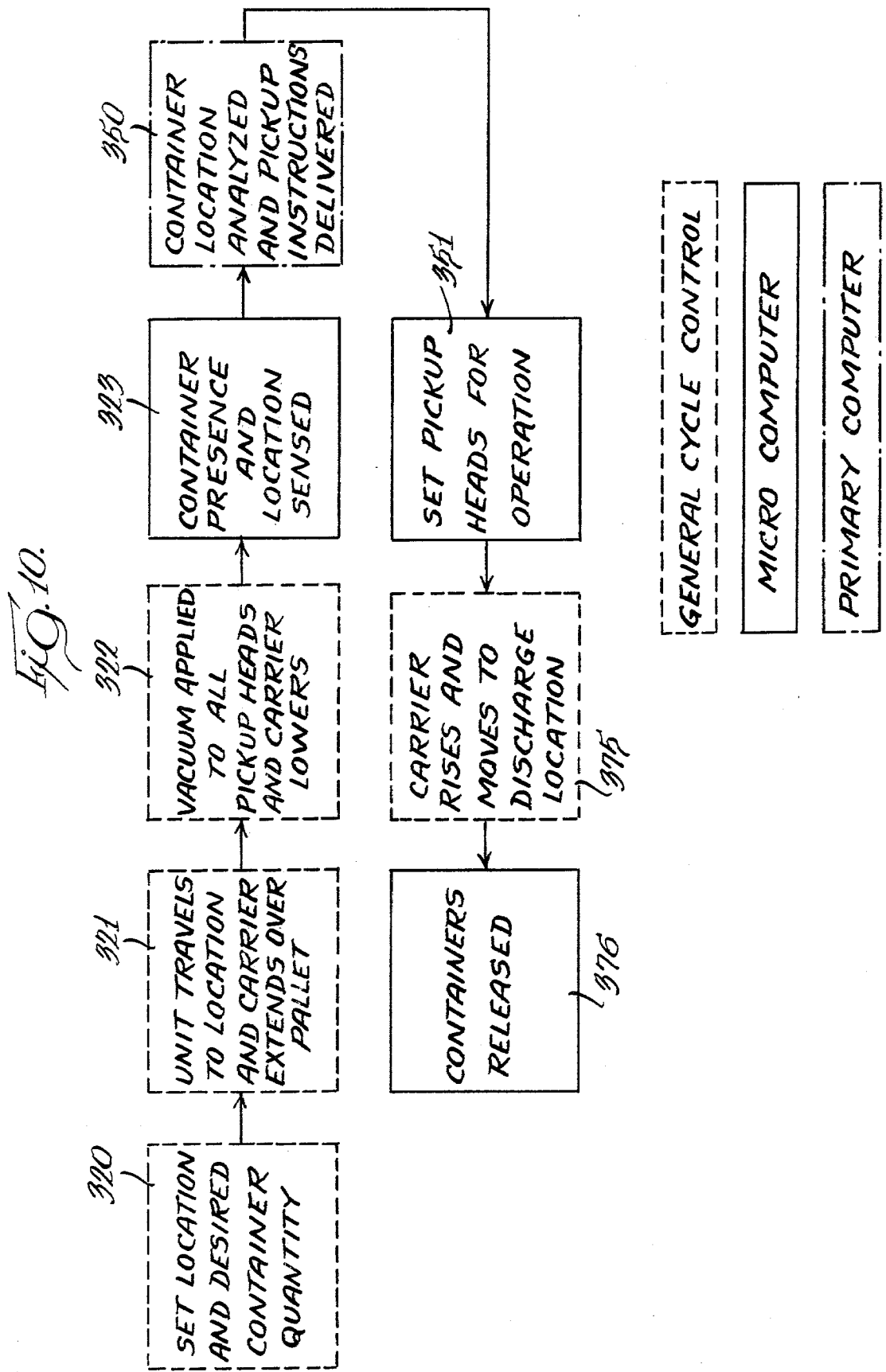

ARTICLE HANDLING SYSTEM

CROSS-REFERENCE TO RELATED APPLICATION

This application is a continuation-in-part of application Ser. No. 723,027, filed Sept. 13, 1976, now U.S. Pat. No. 4,114,939, and entitled VACUUM PICKUP HEAD.

BACKGROUND OF THE INVENTION

This invention pertains to article handling systems and, particularly, to box or container picker systems which can detect the presence of containers or boxes in a layer as well as the orientation thereof and then pick up selected boxes for transfer to a discharge station. Additionally, the invention pertains to pickup head structure including miniaturized components and a detector-pickup unit and controls therefor providing new and improved operation.

The prior art has had order-picking apparatus with vacuum pickup heads, with the assignee of this application having built such a structure wherein the vacuum pickup head had an internal vacuum chamber and a rotatable valve plate was operated by a solenoid to move between open and closed positions to control application of a vacuum to a space beneath the head which overlies a container and is sealed thereto by a container-engaging seal element. A structure of this type is shown in an abandoned application, Ser. No. 427,064, filed Dec. 21, 1973.

Additional prior art disclosing vacuum pickup head structure includes U.S. Pat. Nos. 3,351,219; 3,697,112; and 3,716,147. The first of these patents also discloses a container detection system and the pickup of a single container.

SUMMARY OF THE INVENTION

A primary feature of the invention disclosed herein is to provide an article handling system and, particularly a picker system for boxes or containers having a detector-pickup unit with miniaturized components whereby the size, location, and orientation of boxes in a pallet layer may be detected and selected boxes picked up for transfer to a discharge location.

Another feature of the invention is to provide a vacuum operated pickup head having a shallow profile to require minimum height for insertion and withdrawal relative to a storage location and with positively operable valve structure which can open to permit large volumes of airflow for a fast, firm holding action of a container.

Another feature of the invention is to provide a vacuum pickup head wherein the components have been miniaturized to enable detection and pickup of relatively small size containers or boxes and with suction cups being under vacuum control by a fluidic circuit for selective operation to provide for selected box pickup and for association with a similar number of pneumatically-operated sensors used to detect the size, orientation and location of products, such as boxes or containers, in a pallet layer.

Another feature of the invention is to provide a vacuum pickup head having a casing with an interior vacuum chamber and a depending container-engaging seal element to seal the space between the casing and a container, with the bottom wall of the casing having a passage to connect the space with the vacuum chamber, a valve member movable toward and away from the bottom wall between passage open and passage closed positions, and fluid-powered motor means for moving said valve member.

A primary object of the invention disclosed herein is to provide new and improved structure for an article handling system wherein boxes or containers can be identified as to their orientation, location and size in a layer of product on a storage pallet and selected boxes removed from the layer in a cycle of operation.

Other objects of the invention are to provide structure as defined in the preceding paragraph having the features set forth above.

Other features and advantages of the invention will be more fully set forth in connection with the detailed description of the structure disclosed herein.

BRIEF DESCRIPTION OF THE DRAWINGS

FIG. 1 is a plan view of the vacuum pickup head with a top wall of the casing omitted;

FIG. 2 is a fragmentary section, taken generally along the line 2—2 in FIG. 1;

FIG. 3 is a vertical section, taken generally along the line 3—3 in FIG. 1;

FIG. 4 is a view, similar to FIG. 3, showing the mechanism in a different position;

FIG. 10 is a block diagram of the control system for the article handling system.

DESCRIPTION OF THE PREFERRED EMBODIMENTS

Figure 5:
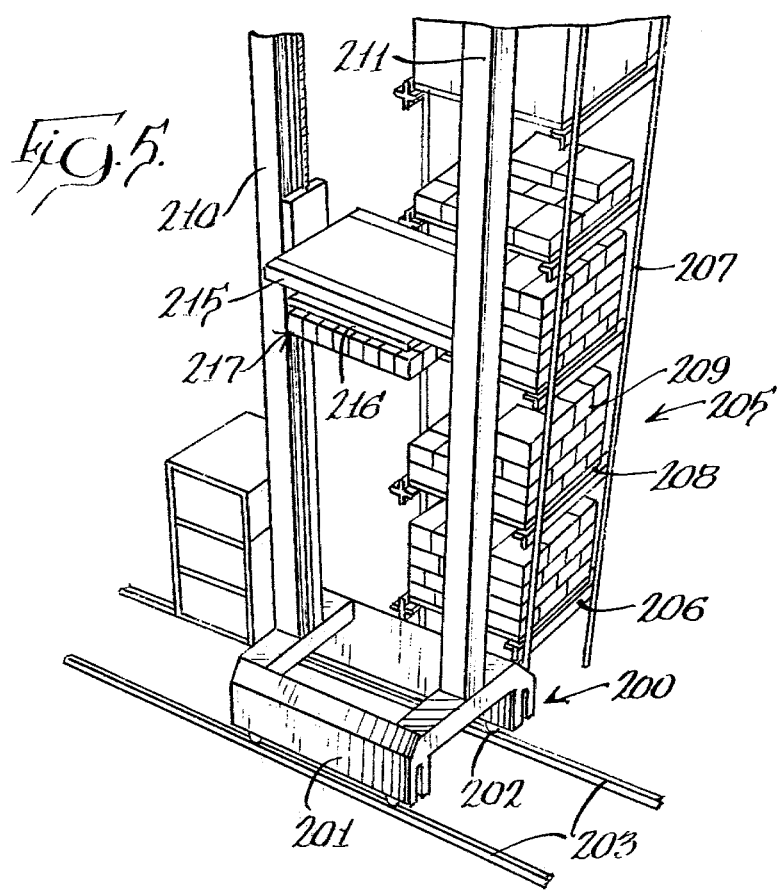
FIG. 5 is a perspective view of the article handling system for boxes or containers.

One form of vacuum pickup head is shown generally at 10 in FIG. 1 and is generally square in plan. One or more of the vacuum cup heads may be mounted on movable structure for movement into a position overlying a layer of containers, such as containers carried on a pallet positioned within a storage bin of a storage rack. A selected number of the vacuum pickup heads may then be activated to engage containers disposed thereneath to apply a vacuum to a sealed space. This enables lifting and withdrawal of the container from the pallet in the storage bin for transport to a different position. The general arrangement of structure for moving the vacuum pickup heads is well known in the art.

The vacuum pickup head has a casing with a top wall 11 and a bottom wall 12 which, with perimetral strengthening walls, as shown at 15, 16 and 17, define a vacuum chamber connectable to a suitable manifold by a conduit 20 and with flow communication to the vacuum chamber through an opening 21 in the conduit and an opening 22 in the perimetral wall 17.

The casing has a depending container-engaging seal element 30 of flexible, rubber-like material and having four sides to define a generally square seal member or suction cup for engagement with a container, indicated at C in FIG. 3. The seal element 30 has an inturned flange 31 extending therearound which is engaged between a perforated plate 32 and a plate 33 and with these parts secured to the bottom wall 12 of the casing by threaded members 34. A plurality of spacers 35 are positioned between the perforated plate 32 and the bottom wall 12 and are held in position by additional threaded members 36.

The bottom wall 12 of the casing has an annular vacuum passage 40 which opens to a central recess 33a in plate 33 for applying a vacuum to the space beneath the casing and enclosed by the seal element 30 dependent upon the position of a valve member or plate 41. The valve member 41 is in the form of a flexible disc having its center fastened to the lower end of a valve stem rod 42 by a threaded member 43 and having an annular sealing member 44 positioned to move against the bottom wall 12 and close the annular vacuum passage 40. The valve member 41 being flexible assures a good seal of the annular sealing member 44 against the casing bottom wall. The vacuum above the valve member assures that the valve member is tightly closed.

A housing, indicated generally at 50, is mounted within the vacuum chamber and has a cylindrical part 51, with a depending flange 52 forming the inner periphery of the annular vacuum passage 40. Laterally-extending parts 53 and 54 of the housing are positioned above the casing bottom wall 12 and supported by spacers 55 and 56 held in fixed position by suitable threaded members whereby the annular vacuum passage 40 communicates with the interior of the vacuum chamber by flow past the spacers 55 and 56.

The upper part of the housing 50 has an enclosed cylindrical chamber 60 mounting a flexible diaphragm 61 fastened at its periphery between parts of the housing 50 and the central part thereof is captured between a pair of plates 62 and 63 which are secured to the upper end of the valve stem 42 by threaded members 64. This structure defines a fluid-powered motor for movement of the valve stem 42 within a bore formed in the central part 51 of the housing and between the positions shown in FIGS. 3 and 4. The valve stem 42 and valve member 41 are shown in a lower open position in FIG. 3 and in an upper, closed position, in FIG. 4. The part of the cylinder 60 beneath the diaphragm 61 is connected to the vacuum chamber at all times through a port 70 opening to the vacuum chamber.

The upper side of the diaphragm is alternately exposed either to vacuum or to atmospheric air by means of an open-ended bore 71 and a transverse passage 72 in the valve stem 42 which, in all positions of the valve stem, communicates with an air line 73 fitted within the housing 50 and having a pipe connection 74. When atmospheric air is communicated to the air line 73, the motor and valve stem are positioned as shown in FIG. 3, since the differential pressure acting on the diaphragm (with a vacuum existing on the underside thereof) results in forcing the valve stem 42 downwardly and against the action of a return spring 80 surrounding the valve stem 42. The return spring 80 engages between the lower diaphragm-engaging plate 63 and a wall 81 of the housing. When the air line 73 is connected to vacuum, the same pressure condition exists on both sides of the diaphragm 61, whereby there is no pressure differential in the motor and the spring 80 is effective to raise the valve stem and move the valve member 41 to the closed position shown in FIG. 4.

The position of the diaphragm motor is controlled by a double coil piloted three-way valve, indicated generally at 90 in FIG. 1, having its normal exhaust port 91 opening to the interior of the vacuum chamber and a second port 92 connected by a line 93 to a fitting 94 which has an opening 95 (FIGS. 3 and 4) connected to a passage 96 in the plate 33 which opens to atmosphere. With the fitting 94 having an interior communicating the opening 95 to the line 93, there is always atmospheric pressure delivered to the valve port 92. The other port 97 of the control valve is connected by a line 98 to the fitting 74 of the air line 73. In one position of the control valve, the line 98 communicates with the exhaust port 91 and, thus, line 98 has the vacuum pressure therein. In the other position of the valve 90, the line 98 is effectively connected to the line 93 whereby the line 98 has atmospheric pressure therein.

In operation of the vacuum pickup head, the structure is in the position shown in FIG. 4 and when lowered onto the top of a container, the seal element or suction cup 30 deflects to closely engage the top of the container C. During this time, the air line 73 is connected to vacuum whereby the diaphragm motor is in the position shown in FIG. 4. When a container is engaged, the valve 90 can then be shifted to its other position whereby atmospheric pressure through line 93 is applied to line 98 and the air flows through the air line 73 and the bore 71 of the valve stem to the open upper end thereof to be applied against the top side of the diaphragm 61. This results in a differential pressure acting on the diaphragm to lower the valve stem and the valve member 41. This opens the annular vacuum passage 40, as shown in FIG. 3. With the parts in the closed position of FIG. 4, there is a differential pressure acting on the valve member 41 in a direction to maintain the valve member 41 closed, since there is atmospheric pressure on the underside and vacuum acting on the area of the annular sealing element 44 open to the annular vacuum passage 40. The differential area of the diaphragm which acts to urge the valve plate downwardly is greater than the differential area of the valve plate responsive to differential pressure to hold the valve plate closed and, thus, the valve member 41 will be opened when atmospheric pressure is applied to the upper side of the diaphragm 61.

When it is desired to release the container C, the solenoid valve 90 is shifted back to its original position, whereby the upper side of the diaphragm 61 is connected to vacuum, with the result that the diaphragm is balanced and the spring 80 urges the valve stem and the valve member 41 upwardly to the closed position of FIG. 4. There is a pressure drop through the orifice created between the annular vacuum passage and the annular sealing element 44 as they move toward closed position which assists in fast closing of the valve.

An added feature of the invention is the provision of a second air conduit in the housing 50 including a port 100 and a passage 101 which connect with the fitting 94 through a line 102 whereby atmospheric pressure at all times exists at port 101 and this port 101 selectively communicates with a longitudinally-extending groove 105 in an outer surface of the valve stem 42. When a vacuum is being applied to the space beneath the casing, as shown in FIG. 3, the port 101 and the groove 105 are out of communication whereby there is no effect on the vacuum being applied. As the valve member 41 moves upwardly toward the closed position of FIG. 4, the groove 105 will come into communication with the port 101 shortly prior to complete closing of the valve plate. This results in atmospheric air entering the sealed space by downward travel through the stem groove 105 through openings 106 in the valve member 41 and through perforated plate 32 to destroy the vacuum within the sealed space to permit ready release of the container C and to also assist in final closing of the valve.

The double coil piloted three-way valve 90 is responsive to two different signals in controlling the action of the vacuum pickup head. When the vacuum pickup head is lowered onto a container C, a contact plate 110 is moved upwardly to permit operation of a switch 111 to a position to energize one of the coils of the valve. The contact plate 110 is mounted at the lower end of a stem 112 which is movable within a tube 115 positioned within the vacuum chamber, with the stem 112 having a laterally-extending pin 116 urged by a pair of springs 117 to a lowered position within a pair of slots 118 in the tube to position the contact plate 110 in its lowermost position. When a container C is engaged by the contact plate 110 during lowering of the vacuum pickup head, there is upward movement of the stem within the tube 115 against the action of the springs 117 whereby a contact finger 120 permits movement of the switch arm 121. A control circuit (not shown) may determine which valves of which heads are to operate and the contact plate 110 may merely confirm that a container is present.

The other coil of the valve would be activated by the control circuit which determines the appropriate time for release of a container and for movement of the valve member 41 to the closed position of FIG. 4.

With this structure, it will be seen that a shallow profile vacuum pickup head has been provided wherein the annular vacuum passage permits the flow of large volumes of air for quick action. The structure is operable with a fluid-operated motor means, avoiding a requirement for solenoids drawing substantial power and subject to burn-out problems. The use of a solenoid to shift the valve member would also add to the height of the vacuum pickup head. The linearly-movable valve member and valve stem provide improved action in opening and closing and with the valve stem providing for an automatic shot of air at the closing of the valve member to facilitate closing as well as to provide positive release of a container which has been held by a vacuum.

An article handling system and, more particularly, a box or container picker system utilizing vacuum pickup heads which are a variation of those shown in FIGS. 1 to 4 is disclosed in FIGS. 5 to 10.

An automated storage-retrieval crane is used in the system which, as known in the art, includes a stacker crane unit, indicated generally at 200, with a base 201 having guide wheels 202 movable along tracks 203 and a propulsion drive unit for causing said movement to locate the stacker crane at a desired location along an aisle having storage racks for supporting vertical rows of pallets, each of which may carry plural layers of containers, such as boxes. As shown in FIG. 5, a single vertical row of storage racks along the aisle is indicated generally at 205 with means in the form of angle irons 206 secured to vertical members 207 to form supports for pallets 208 carrying stacked layers of containers 209.

The stacker crane has a pair of columns 210 and 211 forming a mast for guiding vertical movement of a platform 215 to a desired level and with the platform having conventional extendable fork structure (not shown) which may extend to either side of the aisle for either placing the pallet 208 into a storage location in the storage racks or for withdrawing a pallet therefrom, with this type of structure being well known in the art and shown generally in Hathcock U.S. Pat. No. 3,737,056, Burt U.S. Pat. No. 3,782,564, and Faletti U.S. Pat. No. 3,892,324.

The underside of the platform 215 has an extendable picker head or carrier 216 which may be extended into a storage bin of the storage racks at a level above the uppermost layer of products in the storage bin and with this carrier defining a detector-pickup unit having multiple sections 217 depending therefrom provided with structure to detect the number of containers existing in the uppermost layer on the pallet, as well as the size and location thereof, with the capability of detecting this even with the containers being of random size.

Figure 7:
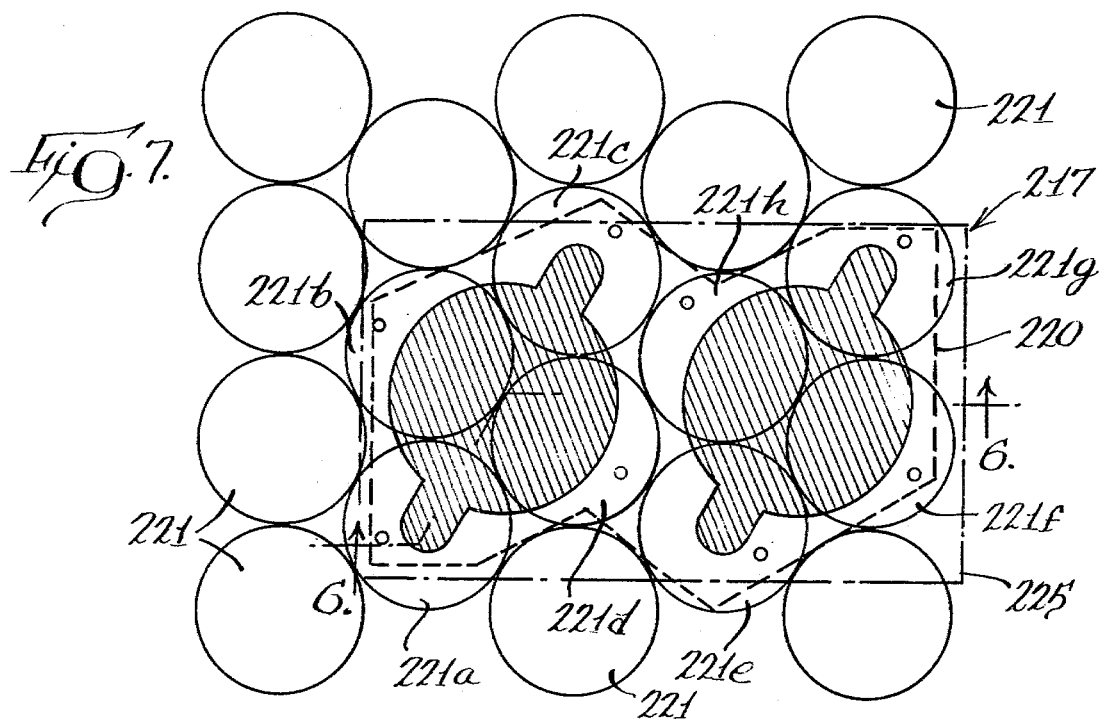
FIG. 7 is a diagrammatic view of a detector-pickup unit.

A basic principle used in the detection and pickup operation is illustrated in the diagrammatic view of FIG. 7 wherein one of the sections 217 and the casing therefor is indicated by a broken line 220 and is shown related to a group of pickup heads in the form of suction cups 221. It will be noted that eight of the suction cups 221 are generally within the perimeter of the broken line 220 indicating one of the sections 217. The structure is miniaturized to have the suction cups 221 of a diameter approximating one inch whereby the lateral dimension of a section would be something less than four inches and the transverse dimension would be something less than three inches, whereby in approximately a twelve square inch area there are eight suction cups positioned to coact with a container if present thereneath and either sense the absence of a container or a gap between containers. As further described in connection with this embodiment and the structure shown in FIG. 6, the suction cups 221 are arranged in groups of four for simultaneous action under the control of a vacuum controlling valve, with the two groups for the section 217 being indicated at 221a–221d and 221e–221h, respectively.

Also as shown in FIG. 7, the suction cups 221 are arranged in rows which extend at an angle to the sides of a layer of product on a pallet in the storage rack 205 to have the rows extend diagonally to the conventional alignment of the containers in the product layer. For illustration purposes, a container is shown in outline by dashed line 225, representing a generally rectangular box and it will be noted that the suction cups 221a, 221b, and 221c of one group as well as suction cups 221e and 221g of the other group do not completely overlie the perimeter of the container and thus these cups will not hold a suction when engaged against the upper surface of the container. This lack of suction capability is used in connection with sensing the size, location and orientation of the containers in a manner to be described. The suction cups 221d, 221f and 221h are fully engaged with the top of a container and, thus, a vacuum can be drawn for use in sensing as well as for pickup of the carton. The section 217 is only one of many sections which are interrelated to form the pickup unit and, in FIG. 7, it will be noted that the suction cups 221a–221h are interfitted with suction cups of other sections 217 to form a complete detector-pickup unit of a size to have a perimeter substantially the same as a complete layer of product on the pallet.

Figure 6:
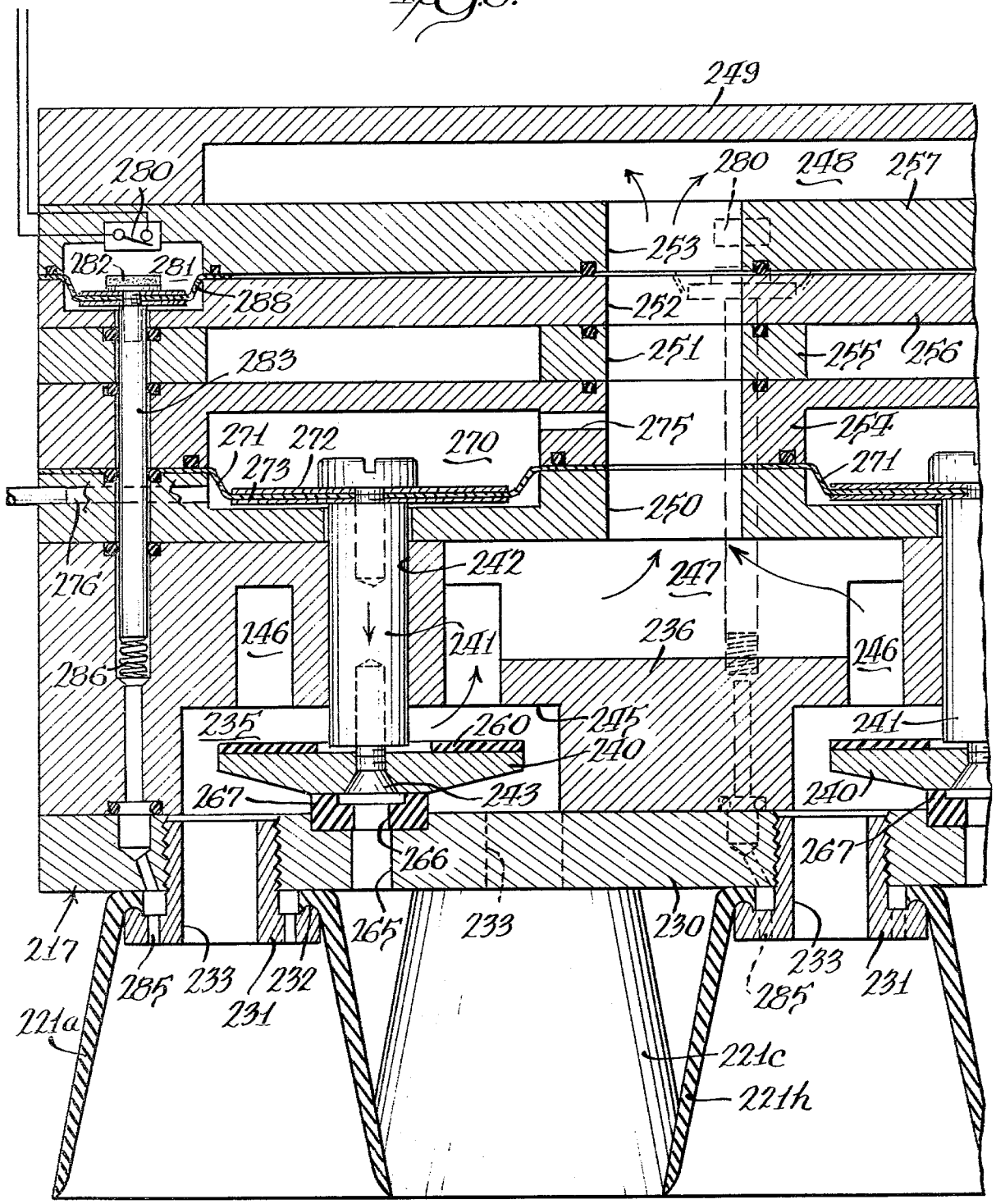
FIG. 6 is a vertical section through a detector-pickup unit, taken generally along the line 6—6 in FIG. 7 and on an enlarged scale.

The structure of a section of the detector-pickup unit is shown particularly in FIG. 6 wherein a multi-layered casing is formed of a plurality of plates, with a bottom plate 230 mounting the suction cups 221 in dependent relation by means of an attaching member 231 engaging an upper flange 232 of the suction cup and having a central tubular passage 233 extending to a chamber 235 formed in a plate 236 secured to the bottom plate 230 of the casing.

The chamber 235 is either at a negative pressure for drawing a vacuum or at atmospheric pressure under the control of a vacuum controlling valve including a valve member 240 carried on a movable rod 241 fitted in a bore 242 in the plate 236. The valve member 240 is loosely fitted to the rod 241 by a headed attachment member 243 threaded into the rod 241 whereby the valve member may adjust to firmly fit against a valve seat 245 formed in the plate 236 and close an annular passage 246 which communicates with an interior space 247 which is connected to a vacuum manifold 248 in a top plate 249 of the casing. This connection is through passages 250, 251, 252, and 253 formed in intermediate plates 254, 255, 256 and 257 of the casing. The upper surface of the valve member 240 is provided with an annular layer 260 of resilient material to assure good seating against the valve seat 245. When the valve member 240 is in the open position, shown in FIG. 6, the passages 233 leading to the suction cups 221 are connected to the vacuum manifold 248 whereby a vacuum is drawn within the suction cup if the suction cup is completely engaged with a container. If there is not complete engagement, then a vacuum will not be drawn within the suction cup since the suction cup partly opens to atmosphere.

When the valve member 240 is raised to engage against the valve seat 245, the connection of the chamber to the vacuum manifold is cut off and an atmospheric air passage is opened to the chamber, with this passage being defined by a bore 265 in the bottom plate 230 which is coaxial with a bore 266 in a permanent magnet 267 fitted in a recess in the upper surface of the plate 230 and coaxial with the rod 241 mounting the valve member. The magnet 267 functions to hold the valve member in open position unless a motor associated with the valve member draws the valve member upwardly with sufficient force to overcome the force of the magnet and place the valve member outside the magnetic field. When the valve member is in its upper position, the passages 265 and 266 are open and atmospheric air can enter the chamber 235 to have the interior of the suction cups at atmospheric pressure.

The operation of the valve member 240 is by a motor of the diaphragm type disposed within a chamber 270 formed by opposing recesses in the casing plates 250 and 254. The motor includes a diaphragm 271 captured between a pair of plates 272 and 273 secured to the rod 241. The outer perimeter of the diaphragm is fastened between the casing plates 250 and 254 and an annular section of diaphragm material is free to flex, whereby the diaphragm may be in the position shown in FIG. 6 when the valve member is open and is upwardly flexed when the valve member is closed. The upper side of the diaphragm is exposed to the negative pressure at an operating value existing in the vacuum manifold 248 at all times during operation by means of a connecting passage 275 which extends to the previously-mentioned passage formed through the casing plates and extending to the vacuum manifold. The underside of the diaphragm is subjected to different pressures, at different times in the cycle of operation, through a control passage 276 extending through the casing plate 250 and to the chamber 270 beneath the diaphragm 271.

The section 217 in FIG. 6 shows two of the valve members 240 and associated structure with each of the valve members controlling the condition of the associated chamber 235. With each chamber 235 associated with the passages 233 for four of the suction cups 221, the two valve members control eight suction cups and which are the eight suction cups 221a–221h of the diagrammatic view of FIG. 7. The cross-hatched area in FIG. 7 shows the particular shape of the two chambers 235.

Means for sensing the presence of a container is also shown in FIG. 6 and which comprises an array of pneumatically-actuated sensors which are the same array as the pneumatic pickup heads and which are equal in number. For illustrative purposes, the sensor is shown as an electric switch 280 mounted in association with a chamber 281 formed by opposed recesses in the casing plates 252 and 253 and operable by a magnet 282 carried at the upper end of a rod 283 which extends longitudinally in a passage formed by bores in the casing plates which extend vertically throughout substantially the entire height of the casing to communicate with a passage terminating in an opening 285 in the attachment means for the suction cup 221. With this construction, when a suction cup 221 has its lower edge sealed against a container and the valve member 240 is open, a vacuum will be drawn within the suction cup which functions to lower the rod 283 and draw the magnet 282 away from the switch 280 and permit it to close. After release of the vacuum, the rod 283 and the magnet 282 are lifted from the position shown in FIG. 6 by a return spring 286 engaged against the lower end of the rod. The upper end of the rod 283 carries a diaphragm 288 having its periphery sealed between the casing plates 256 and 257 to seal off the upper side of the chamber 281. The particular form of sensor shown is illustrative of one of the many different types that may be used, with there being the possibility of using capacitance or diode-type units or other pneumatically-responsive sensor devices.

The foregoing structure has been specifically described in association with suction cup 221a and it will be noted that an exactly similar structure is shown associated with suction cup 221h in FIG. 6.

Figure 8:
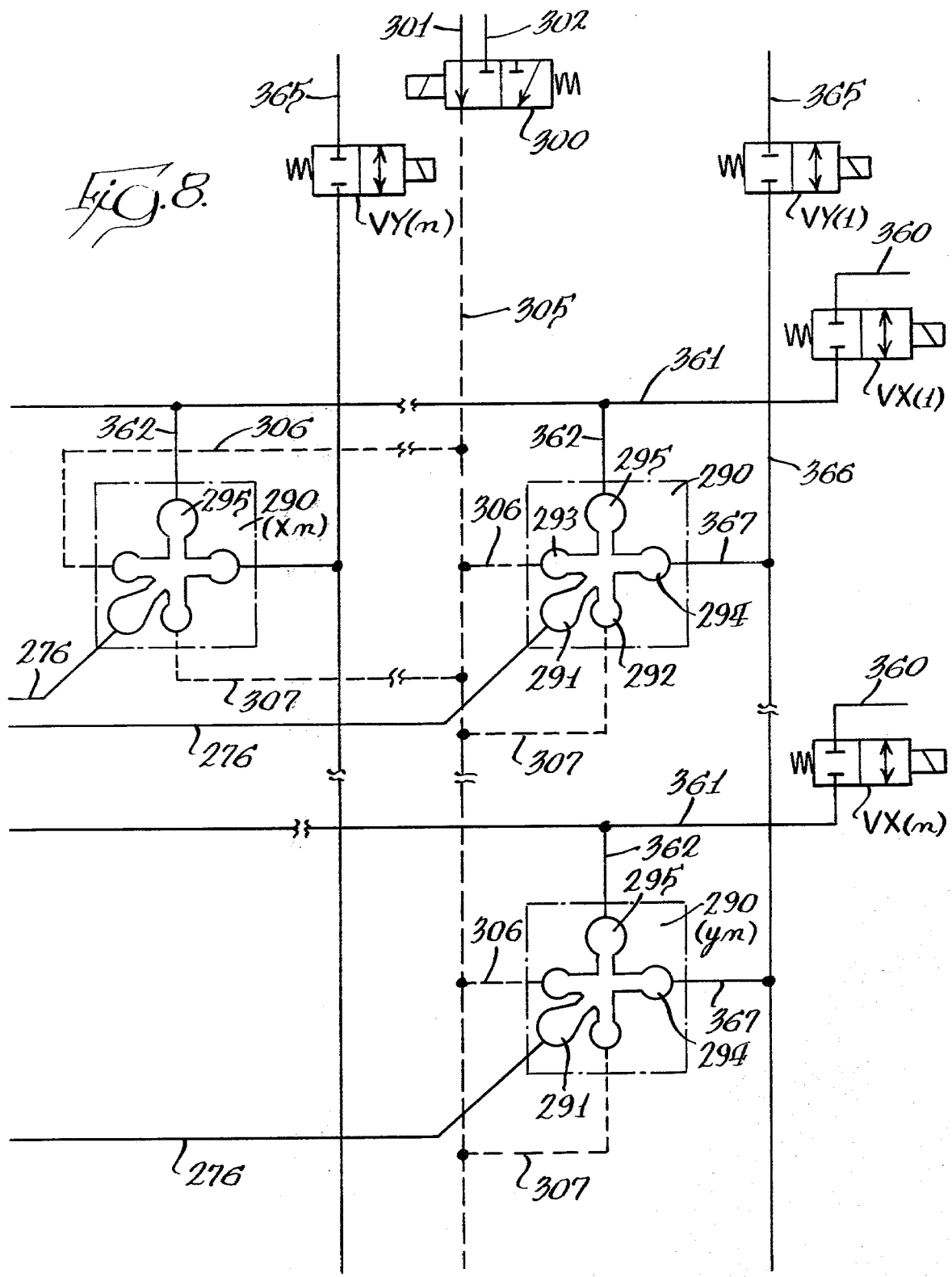
FIG. 8 is a schematic circuit diagram of the fluidic control circuit with parts broken away.

In a typical system, there would be sufficient of the sections 217 in side-by-side relation to provide approximately 2500 of the suction cups 221 for detection and pickup with respect to containers in a layer on a normal size pallet and, as previously mentioned, each suction cup would preferably have a diameter of approximately one inch. This results in there being also approximately 2500 of the sensor switches 280, with there being one switch per suction cup. With there being four suction cups associated with each of the vacuum controlling valves, there are approximately 625 of the valve members 240. The fluidic circuit for controlling the valve members 240 by operation of the associated motors is shown in FIG. 8, with there being fluidic valves 290 equal in number to the valve members 240. Each of the fluidic valves has an actuating port 291 connected to the control line 276 leading to the associated motor chamber 270 and as previously described in connection with FIG. 6. Additionally, each fluidic valve has a pair of vacuum vents 292 and 293 and a pair of pilot parts 294 and 295. The fluidic valve is known to have the characteristics whereby a negative pressure applied to the vacuum ports 292 and 293 will result in a negative pressure at the actuating port 291 when the pilot ports 294 and 295 are inactive. If only one of the pilot ports becomes active by being connected to atmosphere, this does not affect the existence of a negative pressure at the actuating port 291. If both pilot ports 294 and 295 are connected to atmosphere, then the actuating port 291 will be at atmospheric pressure. Thus when the actuating port 291 has a negative pressure, this negative pressure is also existing at the underside of the diaphragm 271 of the valve actuating motor and, similarly, when the actuating port 291 is at atmospheric pressure, this condition also exists under the diaphragm 271.

The fluidic valves comprise switches for control of the valve operating motors and with the fluidic switches being arranged in coordinate rows including X coordinate rows and Y coordinate rows. The fluidic device 290 is arranged in an X coordinate row with additional fluidic devices with the last in the coordinate row being indicated at 290 (xn). A Y coordinate row includes the fluidic device 290 with the last fluidic device being indicated at 290 (yn). In the example given, there would be 25 fluidic switches in each X coordinate row and 25 fluidic switches in each Y coordinate row. With these two coordinate rows of fluidic switches, it is possible to have control thereof from a micro-computer for selective operation of vacuum controlling valves in a pickup operation and to also have control of all fluidic devices from the general cycle control for applying vacuum to all suction cups in a sensing operation, and subsequently to remove suction from all suction cups that have been engaged with a product during transport thereof for dropping or release of the containers.

A first 3-way valve 300 associated with the fluidic switches is connected to a pair of lines 301 and 302 connected to negative pressures of different values and, as an example, the line 301 is connected to a source of vacuum of approximately 5" hg., while the line 302 is connected to a vacuum of $2\frac{1}{2}$" hg. The valve 300 is shown positioned to connect a master vacuum line 305 to the vacuum line 301. The master vacuum line 305 has a pair of branch connections 306 and 307 to the vacuum vent ports 292 and 293 of every fluidic switch in the circuit. When the valve 300 is positioned as shown in FIG. 8 and with the pilot ports 294 and 295 inactive, the higher negative pressure exists in each of the actuating ports 291 whereby the underside of all of the motor diaphragms 271 are subject to the higher value of negative pressure. With the vacuum manifold 248 (FIG. 6) being connected to an operating negative pressure source of a lesser value and as an example $2\frac{1}{2}$" hg. there is resultingly a force acting on the motor diaphragm 271 which moves the valve members 240 to the open position shown in FIG. 6. The actuation of the valve 300 to the position shown in FIG. 8 is merely a momentary pulse and, thereafter, the valve returns to a position where the line 302 is connected to the master vacuum line 305. This results in approximately equal pressure on both sides of the motor diaphragm 271. However, the magnets 267 hold the valve members 240 open, once they have been moved to an open position. This has connected all of the suction cups 221 to the vacuum manifold 248.

Reference is now made to FIG. 10 wherein a block diagram of the picker system shows the function performed by the elements in the system, with the blocks in broken line representing functions carried out by the general cycle control for the system. Functions carried out by a micro-computer are shown in solid line blocks, while functions carried out by a primary processor are shown in dot-dash line. The components providing these controls are well known in the art. The block 320 shows an initial input to the general cycle control with respect to the location of the desired storage rack having the desired product and the quantity of containers to be withdrawn. This inputs to a block 321 of the general cycle control to cause the unit to travel to the desired location and have the carrier or picker head 216 extend over the top layer in a pallet in a storage bin. The next step in the general cycle control is indicated by block 322 to have the valve 300 operated to connect the higher negative pressure line 301 to the master vacuum line 305 and to also apply a vacuum to all of the suction cups 221 and to also lower the carrier 216 to bring the suction cups to a level to have them engage the upper side of containers that exist in the uppermost layer on the pallet. Those suction cups which fully engage against a container maintain the vacuum and this leads to the function of the micro-computer, indicated by block 323, which senses container presence and location. Those sensor switches 280 which close because of an application of a vacuum within the suction cup which is maintained by engagement with the container indicate contact with a container, but individually do not give any intelligence as to the size, location or orientation of the container.

Figure 9:
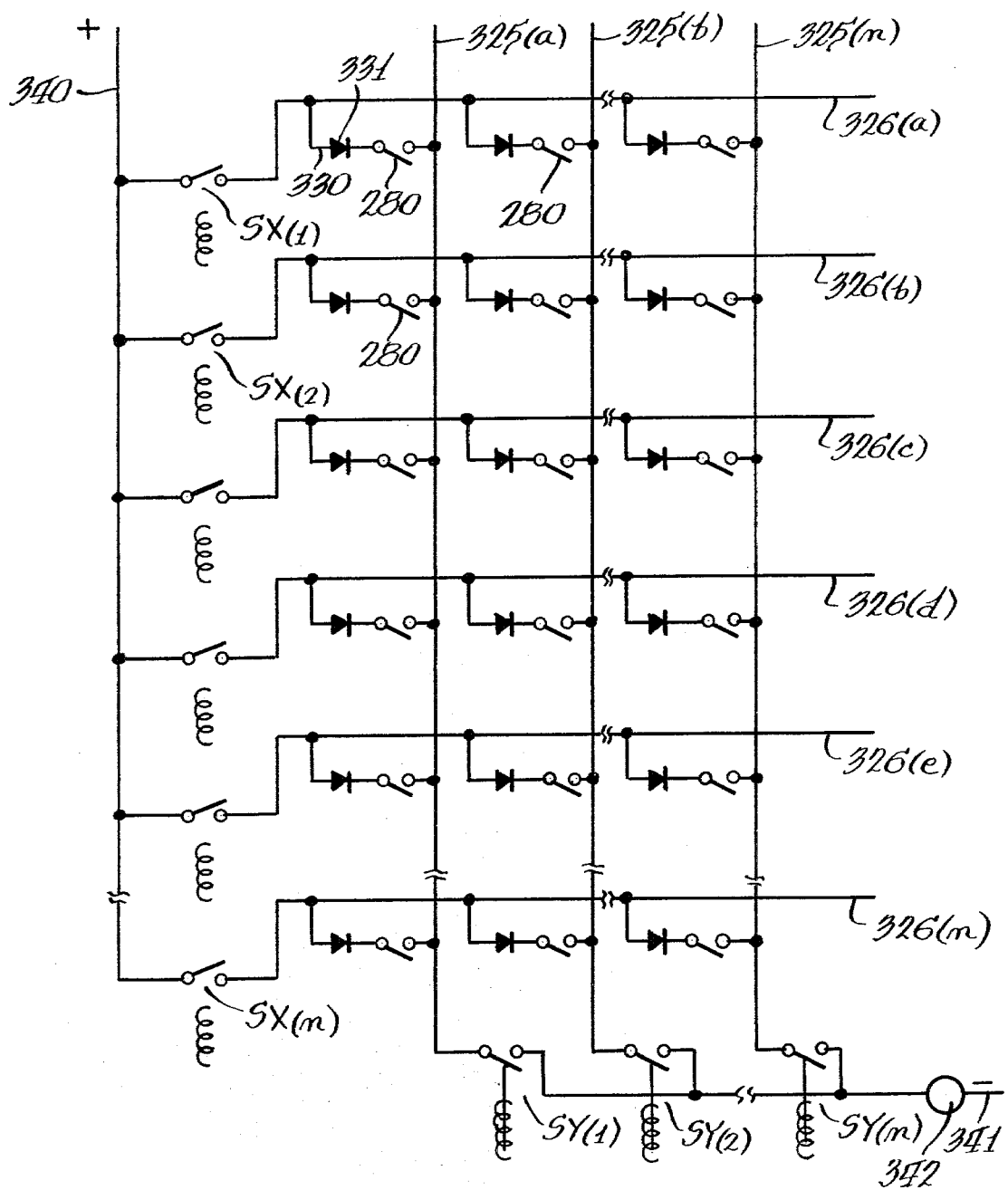
FIG. 9 is a schematic circuit drawing of the sensor circuit for detecting boxes or containers with parts broken away.

The sensor switches 280 are shown in circuit in FIG. 9 and are electrically-connected in series in X coordinate rows and Y coordinate rows in a DC circuit. The connection in Y coordinate rows is by line $325_{(a)}$, $325_{(b)}$, and ultimately $325_{(n)}$, with there being approximately 50 of said lines in the example given, with there being 2500 suction cups and 2500 sensors. The X coordinate rows are provided by lines $326_{(a)}$–$326_{(e)}$, with there being an ultimate number indicated by $326_{(n)}$ and in the example given there being 50 of said X coordinate lines and 50 of the Y coordinate lines to place each of said 2500 sensors in one coordinate location in one X coordinate line and one Y coordinate line. Specifically, each of the sensor switches 280 is connected to an X coordinate line and a Y coordinate line by an interconnecting line 330 including a diode 331 which blocks electrical flow in one direction through the branch line.

Each of the X coordinate lines 326 has a relay-operated switch SX, with the switch $SX_{(1)}$ being in line $326_{(a)}$, switch $SX_{(2)}$ being in line $326_{(b)}$, and switch $SX_{(n)}$ being in line $326_{(n)}$ and with all of these relay switches being connected to the plus side of the DC circuit by a line 340. Each of the Y coordinate lines 325 has a relay operated switch SY which connects a Y coordinate line to a negative line 341 of the DC circuit and having a logic circuit sensor 342. The relay switch $SY_{(1)}$ connects the negative line 341 to the Y coordinate line $325_{(a)}$, relay switch $SY_{(2)}$ connects the coordinate line $325_{(b)}$ and the relay switch $SY_{(n)}$ connects the negative line to the coordinate line $325_{(n)}$. With this circuit, the micro-computer may operate the $SX_{(1)}$ relay switch to connect the X coordinate line $326_{(a)}$ to the positive line 340 and the micro-computer then successively energizes the relay switches SY to read successive coordinate positions along the X coordinate line $326_{(a)}$ and, if the sensor switch 280 at a particular coordinate has been closed, this completes the circuit to operate the logic circuit sensor 342. After scanning the X coordinate row $326_{(a)}$, the relay switch $SX_{(1)}$ is deenergized and the relay switch $SX_{(2)}$ energized and, again, the relay switches SY are sequentially energized, with this operation being repeated throughout all X coordinate rows, with the result that the micro-computer has information as to the presence or absence of a container at each of 2500 different coordinates and this information is transmitted to the primary computer. As explained previously, if a suction cup 221 does not fully seat on a container, then its associated sensor does not give a container-present signal.

Referring back to FIG. 10, the transmission of information from the micro-computer to the primary computer is shown by transmission from block 323 to block 350. The primary computer, in a manner known in the art, will compare the desired container quantity against the information from the micro-computer as to the availability of containers in the layer and determine which are to be picked up and which are to remain on the layer if there are more containers on the layer than are to be picked up. The primary computer then sends a command by transmitting the data serially to the micro-computer on the picker head with instructions as to which of the valve members 240 are to remain open for pick up of containers and which valves are to close to leave a container or containers unpicked. This information is transmitted to block 351 of FIG. 10.

Referring back to FIG. 8 showing the circuit for the fluidic switches, the micro-computer operates to sequentially control two series of pilot solenoid valves with one series being $VX_{(1)}$–$VX_{(n)}$. These pilot solenoid valves are each connected to an atmospheric line 360 and each valve is associated with an X coordinate row of fluidic switches by means of an air line 361 with a branch line 362 leading to the pilot ports 295 of each of the fluidic switches. A second series of pilot solenoid valves $VY_{(1)}$–$VY_{(n)}$ are each connected to an atmospheric line 365 and with each valve associated with a Y coordinate row of fluidic switches, with the valve $VY_{(1)}$ connected to an air line 366 with branch lines 367 leading to the pilot ports 294 of each of the fluidic devices in one coordinate row. At the time the micro-computer receives the instructions for pickup of particular containers, all of the actuating ports 291 of the fluidic switches are connected to the lesser negative pressure line 302 through the valve 300. Assuming that a container is to be picked up by the suction cups controlled by the fluidic switch identified particularly at 290 and a container engaged by suction cups associated with the fluidic switch $290_{(n)}$ is not to be picked up, the micro-computer will shift the pilot solenoid valve $VY_{(1)}$ to connect the air line 366 to atmosphere. This, alone, is not enough to change the pressure condition at the actuating port 291 of the fluidic devices. The micro-computer will not energize the pilot solenoid valve $VX_{(1)}$ and, therefore, a vacuum is maintained in the suction cups controlled by the fluidic switch 290.

When the air line 366 is connected to atmosphere through the pilot solenoid valve $VY_{(1)}$, atmospheric air delivered to the pilot port 294 is vented through the vacuum vent port 293 to not effect a change of condition of the fluidic switch. Similarly, when a fluidic device has the pilot port 295 connected to atmosphere and not the pilot port 294, the air entering pilot port 294 will be drawn through the vacuum vent port 292 to not effect a change in condition of the fluidic switch. It is a characteristic of the fluidic switch that when both of the pilot ports are receiving air, the actuating port 291 will also be at atmospheric pressure. Sequentially, the pilot solenoid valve $VX_{(n)}$ is energized to connect an air line 361 to the atmospheric line 360 and, through the branch line 362, the pilot port 295 is connected to atmosphere. Since the pilot port 294 is also connected to atmosphere through pilot solenoid valve $VY_{(1)}$ the condition at the actuating port 291 of the fluidic switch $290_{(n)}$ changes to go to atmospheric pressure with the result that atmospheric pressure exists under the motor diaphragm 271 (FIG. 6) and the resulting differential pressure causes lifting of the rod 241 by overcoming the force of the magnet 267 to close the valve member 240. This closes suction from the chamber 235 and opens the chamber to atmosphere through the passage 265 in the casing plate 230, with the result that the associated suction cups are disconnected from vacuum and are rendered incapable of picking up a container.

The micro-computer continues the operation energizing successively those of the pilot solenoid valves VY which are in a coordinate row with fluidic switches to have their condition changed and then the pilot solenoid valves VX are sequentially energized to the extent that they are in a coordinate row where the fluidic device is to have its condition changed. Upon completion of these sequences of operation, the carrier 216 is raised and withdrawn to a position within the aisle of the system and the crane and platform 215 are moved to a product unloading position. Block 375 of FIG. 10 indicates the operation of the general cycle control to move the parts to the discharge location and, thereafter, as indicated by block 376, the micro-computer causes the containers to be released. This last operation is caused by operating all of the VY pilot solenoid valves and VX pilot solenoid valves simultaneously whereby the pilot ports 294 and 295 of all fluidic devices are connected to atmosphere to have all the actuating ports 291 at atmospheric pressure. As previously described, the existence of atmospheric pressure at an actuating port 291 causes a closing movement of the valve member 240.

With the article handling system disclosed herein, a detector-pickup unit operates to scan a layer of containers or boxes on a pallet load in a storage bin to enable transmission of information which can be analyzed to determine the number of containers or boxes in the layer, their size and their orientation because of the miniaturization of the components which enables sensing both presence of containers and absence of containers as well as a space or dividing line between containers. The micro-computer enables rapid scanning of the pneumatically-actuated sensors to determine the conditions of the sensors at multiple coordinates. A determination is made as to which containers are to be picked up and this information is returned to the micro-computer for deactivating those pickup heads which are to not pick up a container and causing other pickup heads to remain activated which are to pick up containers. Miniaturization of components along with control of plural suction cups from a single vacuum controlling valve has provided the capability of accurately determining the size, orientation and presence of various size containers or boxes in a pallet layer and selective pickup thereof.

I claim:

1. An article handling system including a detector-pickup unit having an array of pneumatic pickup heads and a related array of pneumatically-actuated sensors, said pickup heads and pneumatically-actuated sensors being in sufficient numbers to have plural heads and sensors associated with each container in a layer of product, whereby said containers may be of random size and non-predetermined orientation, means for scanning said sensors to determine the size, location, and orientation of containers in said layer of product, command means for ordering one or more products to be lifted from said layer, means for activating selected pickup heads in response to said command means, a plurality of vacuum controlling valves for applying vacuum to said pickup heads, a plurality of fluidic devices associated one with each valve for controlling the operation of the valves, said fluidic devices being arranged in X coordinate rows and Y coordinate rows, a plurality of air lines with one air line for each row of fluidic devices, and means for sequentially energizing said air lines to sequence actuation of selected fluidic devices at certain X and Y coordinates, each of said valves having a differential pressure motor for positioning thereof, a plurality of fluid lines extending one between each fluidic device and a motor, and a master vacuum line connected to all of said fluidic devices whereby a vacuum may be drawn in all of said fluid lines for simultaneous actuation of all of said motors to open all of said valves.

2. An article handling system including a detector-pickup unit having an array of pneumatic pickup heads each in the form of a relatively small suction cup and a related array of pneumatically-actuated sensors associated one with each suction cup, said pickup heads and pneumatically-actuated sensors being in sufficient numbers to have plural heads and sensors associated with each container in a layer of product and oriented to scan products and the space between products, whereby said containers may be of random size and non-predetermined orientation, means for scanning said sensors to determine the size, location, and orientation of containers in said layer of product, command means for ordering one or more products to be lifted from said layer, means for activating selected pickup heads in response to said command means, said plurality of sensors being electrically arranged in plural rows of series connection with several parallel rows comprising X coordinate rows, a sensor in an X coordinate row also being connected in series with other similarly situated sensors to form plural rows comprising Y coordinate rows, a series of control switches associated one with each of said X and Y coordinate rows for sequential activation of Y coordinate rows when a X coordinate row is activated, a plurality of diodes associated one with each sensor to permit current flow in only one direction, plural means each responsive to the presence of a container for actuation of a sensor, and said plural means being oriented to scan both containers and the space between containers.

3. An article handling system including a detector-pickup unit having an array of pneumatic pickup heads each in the form of a relatively small suction cup and a related array of pneumatically-actuated sensors associated one with each suction cup, said pickup heads and pneumatically-actuated sensors being in sufficient numbers to have plural heads and sensors associated with each container in a layer of product and oriented to scan products and the space between products, whereby said containers may be of random size and non-predetermined orientation, means for scanning said sensors to determine the size, location, and orientation of containers in said layer of product, command means for ordering one or more products to be lifted from said layer, means for activating selected pickup heads in response to said command means, a plurality of valves for applying a vacuum to said heads when said valves are open, a differential pressure motor associated with each valve for causing opening and closing thereof, a control system for said motors including a plurality of fluidic devices each having a fluid line extended to an associated motor, a master vacuum line connected to all of said fluidic devices and selectively operable to draw a control vacuum in all of said fluid lines and cause all of said motors to open said valves, and first and second series of atmospheric pilot lines inter-connected with said fluidic devices to have each fluidic device responsive only to one pilot line of each series and operable when both controlling pilot lines are activated to close the associated valve.

4. An article handling system as defined in claim 3 wherein said master vacuum line includes a 3-way valve connected to two different vacuum lines of different negative pressure with one line providing a neutral control of a differential pressure motor and the other line providing a higher negative pressure for causing opening movement of all valves in response to a momentary actuation of said 3-way valve from a normal position.

5. An article handling system as defined in claim 3 wherein each of said atmospheric pilot lines has a normally closed 2-way valve connected to atmosphere, and each fluid device has flow passages whereby when both pilot lines connected thereto are connected to atmosphere the fluid line connected to the motor is connected to atmosphere and the associated valve closes.

6. An article handling system as defined in claim 3 wherein said master vacuum line includes a 3-way valve and each of said valves has magnet means for yieldably holding the valve in open position after said 3-way valve returns to normal position.

7. An article handling system as defined in claim 3 wherein each of said motors and associated valve are connected by a stem, said motor having a diaphragm with one side constantly exposed to an operating vacuum and the other side selectively exposed to either a control vacuum, said operating vacuum or atmosphere for valve opening, neutral and valve closing respectively.

8. An article handling system as defined in claim 7 wherein said valve is in a chamber with a connecting passage leading to an operating vacuum line and having a valve seat, and a plurality of passages from said chamber to a plurality of said vacuum heads whereby one valve controls plural vacuum heads.

9. An article handling system as defined in claim 7 wherein said chamber has a passage opening to atmosphere and aligned with said valve for closing thereof when said valve is in open position and operable to deliver atmosphere to said chamber as the valve closes to facilitate release of a container by said vacuum head.

10. An article handling system including a detector-pickup unit having an array of pneumatic pickup heads and a related array of pneumatically-actuated sensors, said pickup heads and pneumatically-actuated sensors being in sufficient numbers to have plural heads and sensors associated with each container in a layer of product, whereby said containers may be of random size and non-predetermined orientation, said sensors being electrically arranged in plural rows of series connection with several parallel rows comprising X coordinate rows, a sensor in an X coordinate row also being connected in series with other similarly situated sensors to form plural rows comprising Y coordinate rows, means for scanning said sensors to determine the size, location, and orientation of containers in said layer of product comprising a series of control switches associated one with each of said X and Y coordinate rows for sequential activation of Y coordinate rows when an X coordinate row is activated, a plurality of diodes associated one with each sensor to permit current flow in only one direction, plural means each responsive to the presence of a container for actuation of a sensor, and said plural means being oriented to scan both containers and the space between containers, and means for activating selected pickup heads for pickup of selected containers comprising, a plurality of valves for applying a vacuum to said heads when open, a differential pressure motor associated with each valve for causing opening and closing thereof, a control system for said motors including a plurality of fluidic devices each having a fluid line extended to an associated motor, a master vacuum line connected to all of said fluidic devices and selectively operable to draw a control vacuum in all of said fluid lines and cause all of said motors to open said valves, and first and second series of atmospheric pilot lines interconnected with said fluidic devices to have each fluidic device responsive only to one pilot line of each series and operable when both controlling pilot lines are activated to close the associated valve.

11. An article handling system including a detector-pickup unit having an array of pneumatic pickup heads and a related array of pneumatically-actuated sensors, said pickup heads and pneumatically-actuated sensors being in sufficient numbers to have plural heads and sensors associated with each container in a layer of product, whereby said containers may be of random size and non-predetermined orientation, said sensors being electrically arranged in plural rows of series connection with several parallel rows comprising X coordinate rows, a sensor in an X coordinate row also being connected in series with other similarly situated sensors to form plural rows comprising Y coordinate rows, means for scanning said sensors to determine the size, location, and orientation of containers in said layer of product comprising a series of control switches associated one with each of said X and Y coordinate rows for sequential activation of Y coordinate rows when an X coordinate row is activated, means associated one with each sensor to permit current flow in only one direction, plural means each responsive to the presence of a container for actuation of a sensor, and said plural means being oriented to scan both containers and the space between containers, and means for activating selected pickup heads for pickup of selected containers comprising, a plurality of valves for applying a vacuum to said heads when open, a differential pressure motor associated with each valve for causing opening and closing thereof, a control system for said motors including a plurality of fluidic devices each having a fluid line extended to an associated motor, a master vacuum line connected to all of said fluidic devices and selectively operable to draw a control vacuum in all of said fluid lines and cause all of said motors to open said valves, and atmospheric pilot line means interconnected with said fluidic devices selectively operable to close the associated valve.

* * * * *